United States Patent
Ryals et al.

(10) Patent No.: US 7,118,318 B2
(45) Date of Patent: Oct. 10, 2006

(54) WIRE PROTECTOR AND RETAINER

(75) Inventors: Steven Ryals, Pinson, AL (US); Geoffrey Sutcliffe, Kennesaw, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 103 days.

(21) Appl. No.: 10/718,425

(22) Filed: Nov. 20, 2003

(65) Prior Publication Data

US 2005/0109888 A1  May 26, 2005

(51) Int. Cl.
*F16B 15/00* (2006.01)
*F16B 15/02* (2006.01)

(52) U.S. Cl. ........................... 411/475; 411/920

(58) Field of Classification Search ............... 411/475, 411/457, 920–921, 458–460, 466, 469, 13, 411/473, 474, 923

See application file for complete search history.

(56) References Cited

U.S. PATENT DOCUMENTS

| | | | | |
|---|---|---|---|---|
| 249,850 A * | 11/1881 | McGill | ...................... | 24/703.5 |
| 278,263 A * | 5/1883 | Orr, Jr. | ........................ | 52/682 |
| 389,660 A * | 9/1888 | Mandel et al. | ............. | 24/703.4 |
| 420,635 A * | 2/1890 | Stieringer | ................... | 174/159 |
| 426,893 A * | 4/1890 | Wildemore | ................ | 411/471 |
| 463,830 A * | 11/1891 | Gibson | .................... | 52/718.05 |
| 647,169 A * | 4/1900 | Vogel | ........................ | 248/74.5 |
| 648,071 A * | 4/1900 | Griffith et al. | ................. | 24/94 |
| 662,587 A * | 11/1900 | Blake | ......................... | 174/159 |
| 770,479 A * | 9/1904 | Shuster | ........................ | 217/93 |
| 977,615 A * | 12/1910 | Goss | .............................. | 24/94 |
| 1,224,615 A * | 5/1917 | Doyle | ............................ | 16/4 |
| 1,252,541 A * | 1/1918 | Bohlinger | .................... | 384/58 |
| 1,529,881 A * | 3/1925 | Engle | ........................... | 248/71 |
| 1,705,144 A * | 3/1929 | Tobey | ......................... | 174/159 |
| 1,913,864 A * | 6/1933 | Walper | ....................... | 206/453 |
| 2,154,306 A * | 4/1939 | Goodstein | ...................... | 59/71 |
| 2,418,539 A * | 4/1947 | Anderson | ................... | 248/74.5 |
| 2,522,656 A * | 9/1950 | Whalen | ........................ | 59/77 |
| 2,526,902 A * | 10/1950 | Rublee | ........................ | 174/159 |
| 2,684,776 A * | 7/1954 | Rosenstein | .................. | 206/346 |
| 3,085,129 A * | 4/1963 | Anderson | ................... | 174/159 |
| 3,176,945 A * | 4/1965 | Anderson | ..................... | 248/71 |
| 3,241,797 A * | 3/1966 | Anderson | ..................... | 248/71 |
| 3,341,651 A * | 9/1967 | Odegaard | ................... | 174/159 |
| 3,492,907 A * | 2/1970 | Hauck | .......................... | 411/443 |
| 3,787,608 A * | 1/1974 | Colby et al. | ................ | 174/159 |
| 3,853,606 A * | 12/1974 | Parkinson | ................... | 428/461 |
| 3,894,174 A * | 7/1975 | Cartun | ........................ | 174/159 |
| 4,040,149 A * | 8/1977 | Einhorn | ...................... | 248/493 |
| 4,127,250 A * | 11/1978 | Swick | .......................... | 248/71 |

(Continued)

OTHER PUBLICATIONS

Southwire Company; News Release—Southwire Introduces Another Innovation With Color-Coded NM(R) Cable; Southwire website; Jan. 25, 2002; Carrollton, GA.*

(Continued)

*Primary Examiner*—Katherine Mitchell
*Assistant Examiner*—Jeffrey A. Sharp
(74) *Attorney, Agent, or Firm*—Lee & Hayes, PLLC

(57) ABSTRACT

An apparatus for protecting and retaining a wire includes a molded body forming a passage adapted to receive and retain the wire between the molded body and a mounting structure. The apparatus also includes at least three apertures through the molded body where at least one aperture is positioned on an opposite side of the passage. At least one fastener is adapted to mount the molded body to the mounting structure while the molded body is adapted to prevent the at least one fastener from abutting the wire.

8 Claims, 3 Drawing Sheets

U.S. PATENT DOCUMENTS

| | | | | |
|---|---|---|---|---|
| 4,129,059 A * | 12/1978 | Van Eck | 411/475 |
| 4,532,927 A * | 8/1985 | Miksza, Jr. | 606/220 |
| 4,533,102 A * | 8/1985 | Ferrell | 248/74.1 |
| 4,534,350 A * | 8/1985 | Golden et al. | 606/220 |
| 4,548,202 A * | 10/1985 | Duncan | 606/220 |
| 4,573,469 A * | 3/1986 | Golden et al. | 606/220 |
| 4,582,288 A * | 4/1986 | Ruehl | 248/547 |
| 4,627,437 A * | 12/1986 | Bedi et al. | 606/220 |
| 4,691,598 A * | 9/1987 | Lin | 81/44 |
| 4,693,248 A * | 9/1987 | Failla | 606/220 |
| 4,697,045 A * | 9/1987 | Beatty | 174/159 |
| 4,720,260 A * | 1/1988 | Yamaguchi | 431/325 |
| 4,801,061 A * | 1/1989 | Mangone, Jr. | 227/120 |
| 4,801,064 A * | 1/1989 | Mangone, Jr. | 227/120 |
| 4,805,824 A * | 2/1989 | Erickson | 227/120 |
| 4,960,420 A * | 10/1990 | Goble et al. | 606/72 |
| 4,994,073 A * | 2/1991 | Green | 606/220 |
| 5,189,766 A * | 3/1993 | Weber | 24/459 |
| 5,223,675 A * | 6/1993 | Taft | 174/159 |
| 5,250,058 A * | 10/1993 | Miller et al. | 606/154 |
| 5,314,160 A * | 5/1994 | Larsen | 248/547 |
| 5,350,267 A * | 9/1994 | Mangone, Jr. | 411/442 |
| 5,393,184 A * | 2/1995 | Beeuwkes, III | 411/469 |
| 5,414,991 A * | 5/1995 | Kfir et al. | 59/77 |
| 5,441,373 A * | 8/1995 | Kish et al. | 411/442 |
| 5,546,637 A * | 8/1996 | Niedecker | 24/30.5 R |
| 5,620,289 A * | 4/1997 | Curry | 411/444 |
| 5,718,548 A * | 2/1998 | Cotellessa | 411/456 |
| 5,735,444 A * | 4/1998 | Wingert | 227/120 |
| 5,827,032 A * | 10/1998 | Howard | 411/480 |
| D402,540 S * | 12/1998 | Stridh | D8/390 |
| 5,932,844 A * | 8/1999 | MacAller et al. | 174/65 R |
| 5,934,852 A * | 8/1999 | Stingl | 411/372.5 |
| 6,095,739 A * | 8/2000 | Albertson et al. | 411/439 |
| 6,113,332 A * | 9/2000 | Hill | 411/473 |
| 6,305,891 B1 * | 10/2001 | Burlingame | 411/469 |
| 6,634,537 B1 * | 10/2003 | Chen | 227/140 |
| 6,671,185 B1 * | 12/2003 | Duval | 361/807 |
| 6,695,558 B1 * | 2/2004 | Shibata | 411/439 |
| 6,817,895 B1 * | 11/2004 | Kiely | 439/552 |
| 6,835,027 B1 * | 12/2004 | Glass | 405/302.7 |
| 2002/0187019 A1 * | 12/2002 | Campbell et al. | 411/439 |
| 2003/0057697 A1 * | 3/2003 | Duval | 281/42 |
| 2004/0126201 A1 * | 7/2004 | Kobylinski et al. | 411/13 |
| 2004/0165968 A1 * | 8/2004 | LoGiudice | 411/469 |
| 2005/0055961 A1 * | 3/2005 | Albertson et al. | 52/698 |

OTHER PUBLICATIONS

EC&M; 2002 Product of the Year—Announcing our Winner . . . The 2002 EC&M/CEE News Product of the Year; EC&M website; Jun. 2002.* http://www.acmestaple.com/products/wire_cable.html.*

Plastic 3wire Romex Staples, cornerhardware.com Internet catalog, available on Oct. 10, 2003 at www.cornerhardware.com.

Insulated Staple, Aubuchon Hardware Internet catalog, available on Sep. 30, 2003 at www.electrical.aubuchonhardware.com.

* cited by examiner

WIRE PROTECTOR AND RETAINER

BACKGROUND

The subject invention generally and in various embodiments relates to devices for retaining and protecting wires, and more particularly to wire protecting apparatuses for use in retaining wires in an environment where wires may otherwise become damaged by fasteners.

Technicians often are required to mount lines or wires, e.g. flat wire, to mounting objects with fasteners, e.g. staples, nails, etc. As an example illustration, a staple may be held over a section of wire and hammered into place to retain the wire in a desired position on the mounting structure. Most staples and stapling techniques can be applied in such a way that the wire as well as the technician's fingers may become injured if not properly applied. This can create problems such as, for example, causing a short circuit on electrical wires that could be stapled in such a way that exposes the wire to such damage.

It can be appreciated that commercial entities and other organizations that employ workers in elevated environments are aware of the potential risks attendant upon work performed in such environments. In view of this awareness, commercial entities and other organizations devote time and resources to promoting the safety of workers performing work in elevated environments to make the performance of work as safe as possible. Promoting safety of workers in elevated environments may involve instituting training programs and/or providing workers with a variety of support devices, support systems, backup devices and systems, and/or other means that promote the stability and safety of workers in elevated environments. Despite the best efforts of an organization to enhance the safety of its workers and reduce the risk of falling from elevated structures, for example, it is nonetheless difficult to eliminate all risks to workers performing work on such elevated structures.

Redundant systems for promoting safety of workers on elevated utility structures may thus sometimes be used. Such redundant systems can sometimes be beneficial in addition to the myriad of existing support systems, methods, devices and/or other apparatus employed by workers on elevated structures to reduce or mitigate risks associated with falling from utility structures, for example.

SUMMARY

Various embodiments of the present invention include an apparatus for protecting and retaining a wire. The apparatus includes a molded body forming a passage adapted to receive the wire and retain the wire between the molded body and a mounting structure. The apparatus also includes at least three apertures through the molded body wherein at least one aperture is positioned on an opposite side of the passage. Further, the apparatus includes at least one fastener adapted to mount the molded body to the mounting structure. The molded body is further adapted to prevent the at least one fastener from abutting the wire.

Various embodiments of the present invention include an apparatus for protecting and retaining a wire having a first foot portion, a second foot portion, an interconnecting portion, at least three apertures and at least one fastener. The first foot portion has at least one aperture through the first foot portion and the second foot portion has at least two apertures through the second foot portion. The interconnecting portion connects the first foot portion to the second foot portion. The first foot portion, second foot portion and interconnecting portion form a passage beneath the interconnecting portion and between the first foot portion and the second foot portion that is adapted to receive the wire and retain the wire between the interconnecting portion and a mounting structure. In addition, at least three apertures through the interconnecting portion correspond to and align with the apertures of the first and second foot portions. Further, at least one fastener is adapted to mount the apparatus to the mounting structure where the apparatus is adapted to prevent at least one fastener from abutting the wire.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

In the accompanying Figures, there are shown various embodiments of the present invention wherein like reference numerals are employed to designate like parts and wherein.

DETAILED DESCRIPTION

Figure 1:
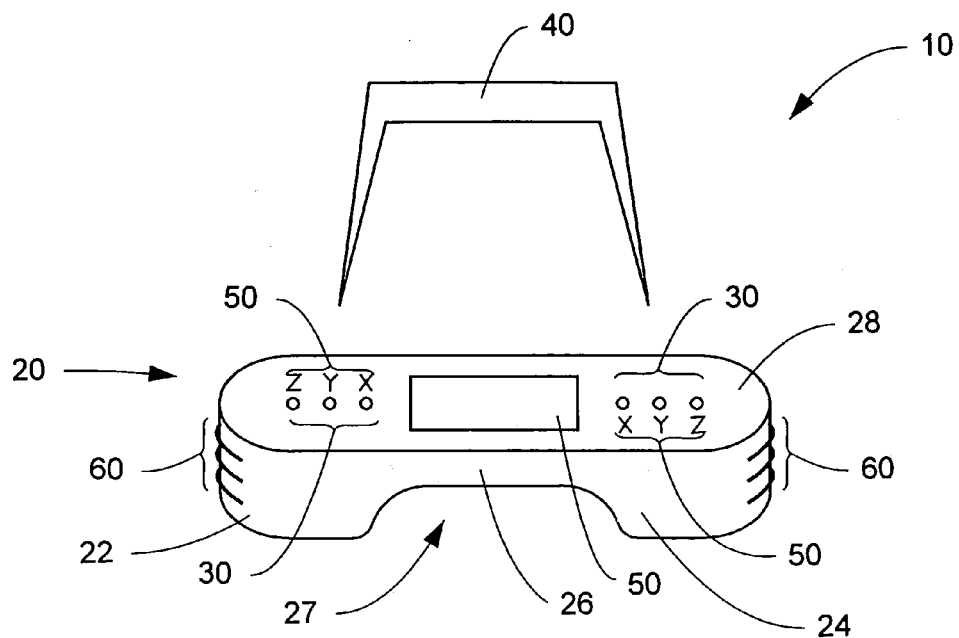
FIG. 1 is a perspective view of a wire protector and retainer apparatus according to various embodiments of the invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upper" or "lower" are relative characterizations only based upon the particular position or orientation of a given component for a particular application.

Figure 2:
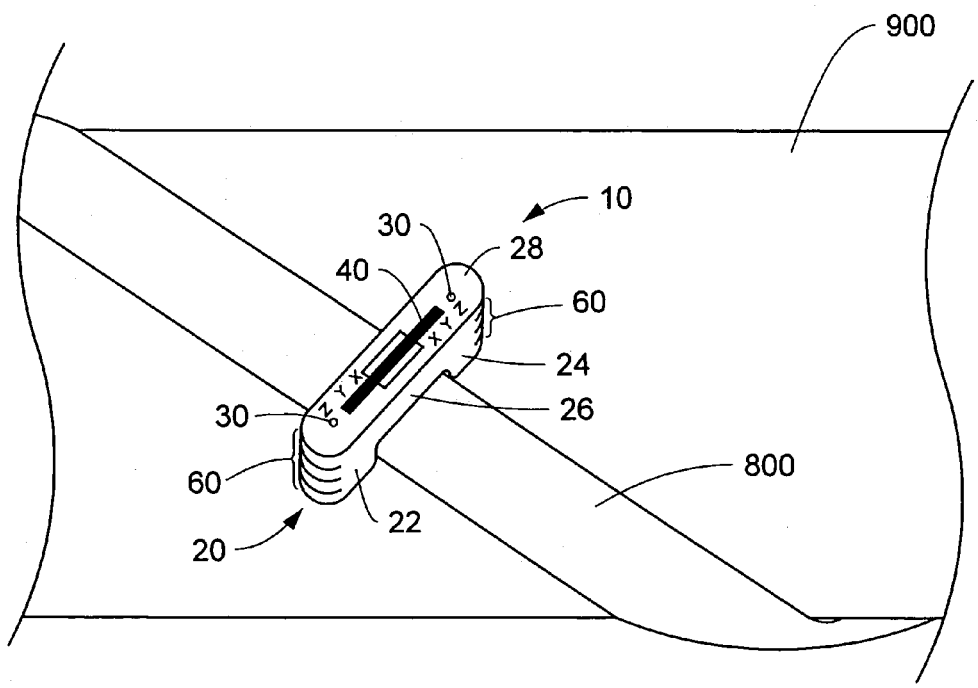
FIG. 2 is a perspective view of the wire protector and retainer apparatus of FIG. 1.

FIGS. 1 and 2 depict various embodiments of a wire retainer 10 that generally can be used by a technician 700 (see FIG. 5 below). As shown, the wire retainer 10 includes a molded body 20 having apertures 30 through the molded body 20. The wire retainer 10 also includes a fastener 40 and alternatively may have one or more of fastener 40.

The molded body 20 has a first foot portion 22, a second foot portion 24 and an interconnecting portion 26. The interconnecting portion 26 connects the first foot portion 22 to the second foot portion 24. The wire retainer 10 forms a passage 27 beneath the interconnecting portion 26 and between the first foot portion 22 and the second foot portion 24 where a wire 800 is retained. As can be seen in FIG. 2, the wire 800 is retained between the wire retainer 10 and a mounting structure 900.

In various embodiments, the molded body 20 forms the passage 27. The passage 27 is adapted to receive the wire 800 and further is able to retain the wire 800 between the molded body 20 and the mounting structure 900 when the fastener 40 is secured to the mounting structure 900 through the apertures 30. In this manner, the fastener 40 mounts the molded body 20 to the mounting structure 900. The molded body 20 can be constructed from a polymeric material including, but not limited to, rubber, plastics, etc.

As shown in FIG. 2, the molded body 20 surrounds the wire 800 such that the molded body 20 receives and contacts the wire 800 sufficiently to retain the wire 800 in a desired position while preventing the overexertion of force that may cause damage to the wire 800. The passage 27 of the molded body 20 is constructed to contact the mounting structure 900 such that the fastener 40 remains inside the molded body 20 and does not contact the wire 800. Thus, the molded body 20 contacts the wire 800 rather than the fastener 40 contacting the wire 800.

A top portion 28 of the molded body 20 provides a surface in which the fastener 40 is prevented from penetrating. As can be seen in FIG. 2, the fastener 40 can be forced through the molded body 20 until meeting with the top portion 28. Where the fastener 40 meets the top portion 28 of the molded body 20, the fastener 40 is thwarted from further penetration through the apertures 30. Also, the molded body 20 prevents the fastener 40 from abutting the wire 800 so as to protect the wire 800 from the fastener 40.

In various embodiments, the apertures 30 are sized to accommodate the fastener 40. Apertures 30 may or may not extend entirely through the molded body 10. Varying spaced apertures 30 are provided as shown in FIGS. 1 and 2 having at least one aperture 30 positioned on an opposite side of the passage 27. Although six apertures 30 are illustrated in the drawings, at least two apertures 30 on one side of the passage 27 and one aperture 30 on another side may also be used to accommodate varying sized fasteners 40. The apertures 30 can be positioned to accommodate fasteners 40 that are standardized or otherwise commonly used. This allows for the wire retainer 10 to be employed in a variety of settings with varying fasteners. As mentioned above, one or more apertures 30 may be provided on each side of the passage 27 for at least one fastener 40.

The fastener 40 is illustrated in FIG. 1 as a staple. The fastener 40 also may be other structures such as, for example, a nail, tack, pin, spike, etc. The fastener 40 can be forced through apertures 30 in the molded body 20 by, for example, a hammer 990. See FIG. 5. The fastener 40 may be a standardized size that is commonly used in the industry. Apertures 30 are spaced and paired to accommodate such standardized sizes of fastener 40.

As depicted in FIG. 1, the wire retainer 10 has identifying indicia 50 that includes information relating the pairs of apertures 30 to the fastener 40. In such embodiments, varying standardized sizes for fastener 40 are indicated on the molded body 20 by the identifying indicia 50. Identifying indicia 50 are illustrated in FIG. 1 with the letters X, Y and Z, as an example, where each letter represents a pair of apertures 30. It will be appreciated that other identifying indicia 50 may be used. Examples of other identifying indicia 50 may include, but are not limited to, symbols, measurements, numerals, etc. In addition, identifying indicia 50 may identify the particular molded body 20 upon which the identifying indicia 50 are placed. Other uses of identifying indicia 50 may include, for example, a barcode, loud colors, etc.

In various embodiments, the wire retainer 10 has grips 60 that are positioned on outer edges of the molded body 20. As shown, the grips 60 are positioned around the outside corners of the molded body 20 to enable a user, such as the technician 700, to hold the wire retainer 10 for mounting it to the mounting structure 900. See FIG. 5. The grips 60 are positioned such that when the wire retainer 10 is held in place over the wire 800 the grips 60 provide a place to hold the wire retainer 10 such that the user is less likely to strike his/her fingers. This is of particular import when the hammer 990 is used to force the fastener 40 through the apertures 30 into the mounting structure 900. The grips 60 may alternatively have grooves rather than be protruding as illustrated in FIGS. 1 and 2.

Figure 5:
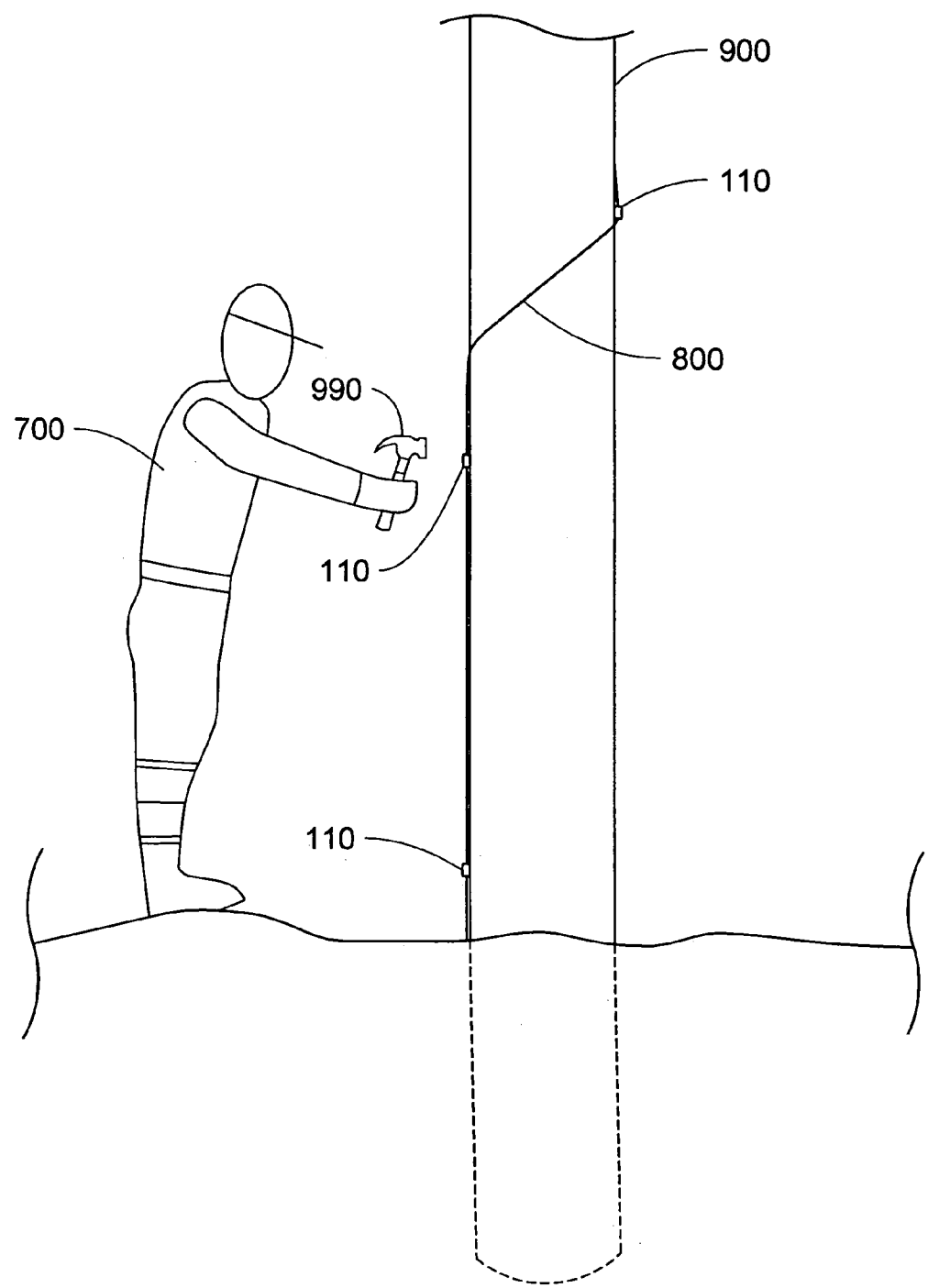
FIG. 5 illustrates various embodiments of the wire protector and retainer apparatus of FIG. 3.

FIGS. 2 and 5 depict a wire retainer 10 that has been mounted by fasteners 40 to the mounting structure 900, thus retaining the wire 800. Generally, a user such as the technician 700 installs the wire retainer 10 by positioning the wire 800 in a desired location and then positioning the wire retainer 10 over the wire 800. The user, or technician 700, then takes the fastener 40 and positions the fastener 40 over the desired apertures 30. The fastener 40 can then be forced through the apertures 30 by, for example, the hammer 990 and into the mounting structure 900 such that the fastener 40 does not contact the wire 800.

Figure 3:
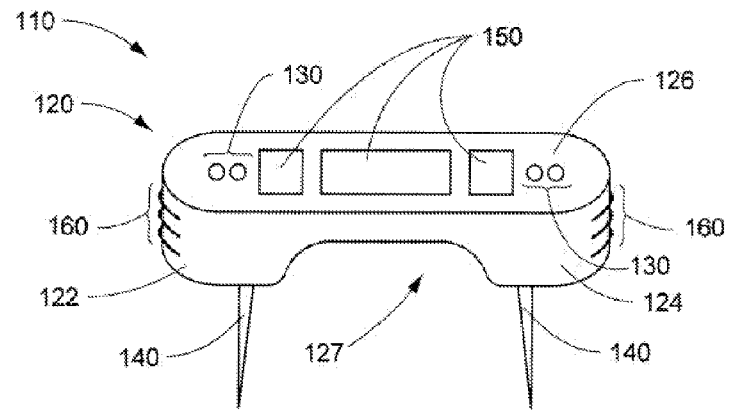
FIG. 3 is a perspective view of a wire protector and retainer apparatus according to various embodiments of the invention.
Figure 4:
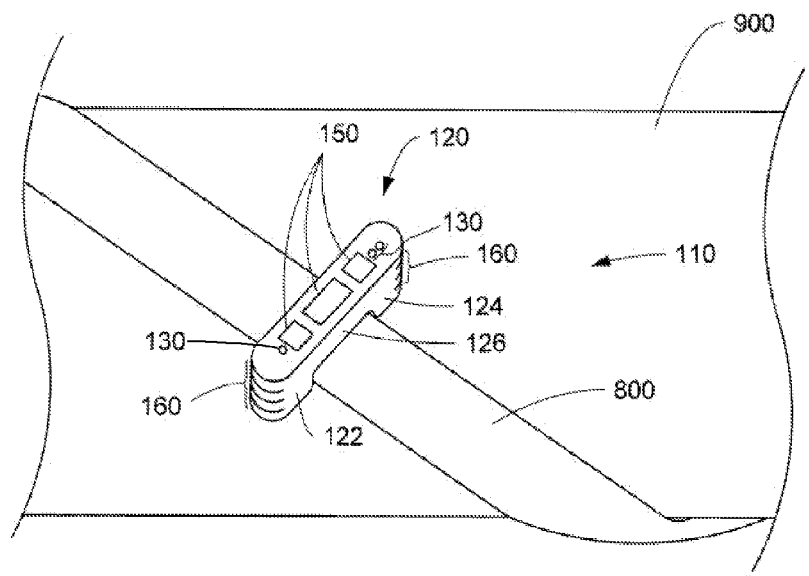
FIG. 4 is a perspective view of the wire protector and retainer apparatus of FIG. 3.

As can be seen in FIGS. 3 and 4, a wire retainer 110 has a first foot portion 122, a second foot portion 124, an interconnecting portion 126 and apertures 130. The interconnecting portion 126 connects the first foot portion 122 to the second foot portion 124. At least three apertures are provided through the interconnecting portion 126 corresponding to and aligned with the apertures 130 of the first and second foot portions. The apertures through the interconnecting portion 126 being substantially axially parallel to and aligned with the apertures 130 of the first and second foot portions. In addition, the first foot portion 122, second foot portion 124, and interconnecting portion 126 may form a single body 120.

The first foot portion 122, second foot portion 124 and interconnecting portion 126 form a passage 127 beneath the interconnecting portion 126 and between the first foot portion 122 and the second foot portion 124 where the wire 800 is retained. As can be seen in FIG. 4, the wire 800 is retained between the interconnecting portion 126 and the mounting structure 900. The wire retainer 110 also has fasteners 140 that mount the wire retainer 110 to the mounting structure 900.

FIGS. 3 and 4 illustrate the fasteners 140 integrated into and extending outward from the single body 120 such that apertures 130 are not necessary for positioning the fasteners 140 through the single body 120. In this manner, apertures 130 may or may not extend entirely through the wire retainer 110. However, apertures 130 may still provide sizing and/or spacing guidance relating to the fasteners 140 and may be paired. Although four apertures 130 are illustrated in the drawings, at least two apertures 130 on one side of the passage 127 and one aperture 130 on another side alternatively may be used. The wire retainer 110 may come in varying sizes having varying sized fasteners 140 to accommodate varying sized wire 800.

The wire retainer 110 can be constructed from a polymeric material including, but not limited to, rubber, plastics, etc. As shown in FIG. 4, the interconnection portion 126, first foot portion 122 and the second foot portion 124 surrounds the wire 800 such that the interconnection portion 126 contacts the wire 800 sufficiently to retain the wire 800 while preventing the overexertion of force that may cause damage to the wire 800.

FIG. 3 depicts the fasteners 140 as integrated into the wire retainer 110. The fasteners 140 also may be other structures such as, for example, a staple, nail, tack, pin, spike, etc. The fasteners 140 can be forced into the mounting structure 900 by, for example, the hammer 990. See FIG. 5. The fasteners 140 may be a standardized size that is commonly used in the industry such that the spacing between the fasteners 140 accommodate standardized sizes of wire.

In various embodiments, the wire retainer 110 has identifying indicia 150. The identifying indicia 150 include information relating the fasteners 140 that are of a standardized spacing for commonly used wire 180. Although identifying indicia 150 are illustrated in FIGS. 3 and 4 with boxes as an example, it will be appreciated that other identifying indicia 150 may be used. Examples of other identifying indicia 150 may include, but are not limited to, symbols, measurements, numerals, etc. Identifying indicia 150 may further identify the particular size of wire retainer 110 upon which the identifying indicia 150 are placed. Other uses of identifying indicia 150 may include, for example, a barcode, loud colors, etc.

In various embodiments, the wire retainer 110 has grips 160 that are positioned on outer edges of the wire retainer 110. As shown, the grips 160 are positioned around the outside corners of the single body 120 to enable a user such as the technician 700 to hold the wire retainer 110 for mounting it to the mounting structure 900. See FIG. 5. The grips 160 are positioned such that when the wire retainer 110 is held in place over the wire 800, the grips 160 provide a place to hold the wire retainer 110 such that a safer mounting of the wire retainer 110 is more likely. This is of particular import when the hammer 990 is used to force the fasteners 140 into the mounting structure 900. See FIG. 5. The grips 160 may alternatively be grooves rather than protruding as illustrated.

As shown in FIGS. 4 and 5, the wire retainer 110 is mounted by fasteners 140 to the mounting structure 900, thus retaining the wire 800. Generally, a user the technician 700 installs the wire retainer 110 by positioning the wire 800 and then positioning the wire retainer 110 over the wire 800. The technician 700 then takes the hammer 990, for example, and forces the fasteners 140 into the mounting structure 900. Thus, the wire retainer 110 retains the wire 800 against the mounting structure 800 such that the fasteners 140 do not contact the wire 800.

FIG. 5 illustrates the wire 800 in a retained position as installed by the technician 700. As shown, the wire retainer 110 has been forced into the mounting structure 900 by the hammer 990. When the wire retainer 110 is positioned over the wire 800 and mounted on the mounting structure 900, the wire 800 is thus retained in the desired position. Thus, the wire 800 may be retained on the mounting structure 900 by the wire retainer 110.

Whereas particular embodiments of the invention have been described herein for the purpose,of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. An apparatus for protecting and retaining a wire, the apparatus comprising:
   a first foot portion having at least one aperture therethrough;
   a second foot portion having at least two apertures therethrough; and
   an interconnecting portion connecting the first foot portion to the second foot portion, wherein the first foot portion, the second foot portion and the interconnecting portion form a passage beneath the interconnecting portion and between the first foot portion and the second foot portion adapted to receive the wire and retain the wire between the interconnecting portion and a mounting structure, wherein the apertures extending through said first and second foot portions also extend through said interconnecting portion;
   a staple for securing the apparatus to the mounting structure, said staple having a first leg and a second leg being spaced from said first leg by a predetermined standard distance, said first leg being received in an aperture of the first foot portion and said second leg being received in an aperture of the second foot portion, wherein the apparatus is adapted to prevent the staple from abutting the wire; and
   identifying indicia on said interconnecting portion adjacent to each aperture of said first and second foot portions, said indicia comprising information relating to said predetermined standard distance, so as to indicate the correct aperture placement of said staple within the apparatus in relation to its size.

2. The apparatus of claim 1, further comprising at least one of protruding grips and grooves disposed on outer edges of the opposed ends of the polymeric body.

3. The apparatus of claim 1, wherein the indicia are disposed on a top surface of the polymeric body and identify a size of the staple and a size of the retainer on which the indicia are placed.

4. The apparatus of claim 1, wherein the staple is integrated into the polymeric body, such that prongs of the staple extend outward from the polymeric body.

5. The apparatus of claim 1, wherein the first foot portion, second foot portion, and interconnecting portion are molded.

6. The apparatus of claim 1, wherein the first foot portion, second foot portion, and interconnecting portion form a molded polymeric body.

7. The apparatus of claim 1, wherein the indicia comprise measurements.

8. The apparatus of claim 1, wherein the indicia comprise a barcode.

* * * * *